United States Patent
Prahl

[15] 3,649,968
[45] Mar. 21, 1972

[54] ANGULAR ADJUSTMENT CONNECTOR FOR PROSTHETIC LIMB PARTS

[72] Inventor: Jan Prahl, Golenhof, Germany
[73] Assignee: Wilhelm Julius Teufel, Stuttgart, Germany
[22] Filed: Sept. 4, 1970
[21] Appl. No.: 69,841

[30] Foreign Application Priority Data

Sept. 12, 1970 Germany ............... P 19 46 257.8

[52] U.S. Cl. .................................. 3/21, 3/1.2, 3/30, 287/12
[51] Int. Cl. ........................................... A61f 1/08
[58] Field of Search .................. 3/21, 1.2, 1, 22, 30, 31, 2; 287/12, 21

[56] References Cited

UNITED STATES PATENTS

| 2,368,917 | 2/1945 | Dumelin | 3/21 |
| 2,470,480 | 5/1949 | Fogg | 3/1.2 |
| 3,538,516 | 11/1970 | Bailey et al. | 3/21 |

FOREIGN PATENTS OR APPLICATIONS

| 910,953 | 5/1954 | Germany | 3/22 |

*Primary Examiner*—Richard A. Gaudet
*Assistant Examiner*—Ronald L. Frinks
*Attorney*—Richard Low and Murray Schaffer

[57] ABSTRACT

A connector for joining sections of a prosthesis comprising body and base members. The body is provided with a plurality of hydraulic support bearings and means fastening the base to it. The fastening means are adjustable to provide a selected angular relationship between the members. This relationship is maintained by the reaction of the bearing support to the fastening means.

14 Claims, 2 Drawing Figures

PATENTED MAR 21 1972                    3,649,968

INVENTOR.
JAN PRAHL
BY
ATTORNEY

ANGULAR ADJUSTMENT CONNECTOR FOR PROSTHETIC LIMB PARTS

BACKGROUND OF INVENTION

The present invention relates to prosthetic devices and in particular to an adjustable connecting member for use in joining two articulated or non-articulated parts of artificial limbs.

Because prosthetic devices are now mass-produced by assembly line techniques, they must be individually fit and adjusted to conform to overall posture and bone structure of the wearer. This is a particular problem with regard to the ankle joint between the shank of the leg and the foot, which must be adjusted to a particular angle. Further, such a joint must be of a construction to withstand the heavy use and impact to which it might be subjected. Joints other than the ankle may also require the same contructional features.

A number of adjustable connecting devices are known. For example, in one such device, an extension is angularly secured by a suitable fastening means within a cylindrical sleeve which is itself secured within the dovetail slots of a pair of opposed plates. The plates are connected so that they may be readily adjusted slideably and rotatively relative to each other to obtain a desired angular position. In another device the tubular extension of the limb is provided with a ball, or a socket, while a base plate connected to the other limb member is provided with a cooperating ball or socket. This latter device is provided with a plurality of set screws which fasten the ball and socket into a fixed angular position.

While these devices are suitable for the intended purpose, they are constructed so that a single fixed angle of inclination is obtained which carries the entire work load and wear of the device. Furthermore, these devices are not resilient and do not compensate for momentary impacts beyond those normally expected.

The known devices, furthermore, are generally heavy and complex increasing the discomfort to the wearer and the effort required to manipulate the prosthesis. Also, they have considerable length, often interfering with the design of the overall prosthesis.

It is the object of the present invention to provide an adjustable connecting device for use with prostheses, which overcomes the disadvantages of the prior art.

It is another object of the present invention to provide improved prostheses.

It is an object of the present invention to provide an improved connecting member for prostheses which is simply constructed, inexpensive and small of size.

It is another object of the present invention to provide an improved connecting member, which is sturdy and rugged as well as being light and small.

These objects and others together with numerous advantages will be seen from the following disclosure.

SUMMARY OF INVENTION

According to the present invention a connector for joining two sections of a prosthesis comprising a body and base member each being adapted to be connected or formed integrally with one of the prosthetic sections. The body is provided with a plurality of hydraulic bearings in fluid communication with each other. The base abuts against the bearing members, and adjustable fastening means are provided for securing the base at a selected angle with the body. The fastening means and the bearing means providing reactive forces which maintain the body and base under tension at the selected angle.

In the preferred form of the connector, the hydraulic bearing comprises at least three pistons and cylinders arranged in triangular fashion. The fastening means comprise screws or bolts arranged in a similar but mirror inverted array. The hydraulic bearings are interconnected by a series of ducts maintaining the pressure in the bearings equal.

Complete details of the present invention and an exposition of its inventive features follow herein.

DESCRIPTION OF INVENTION

Figure 1:
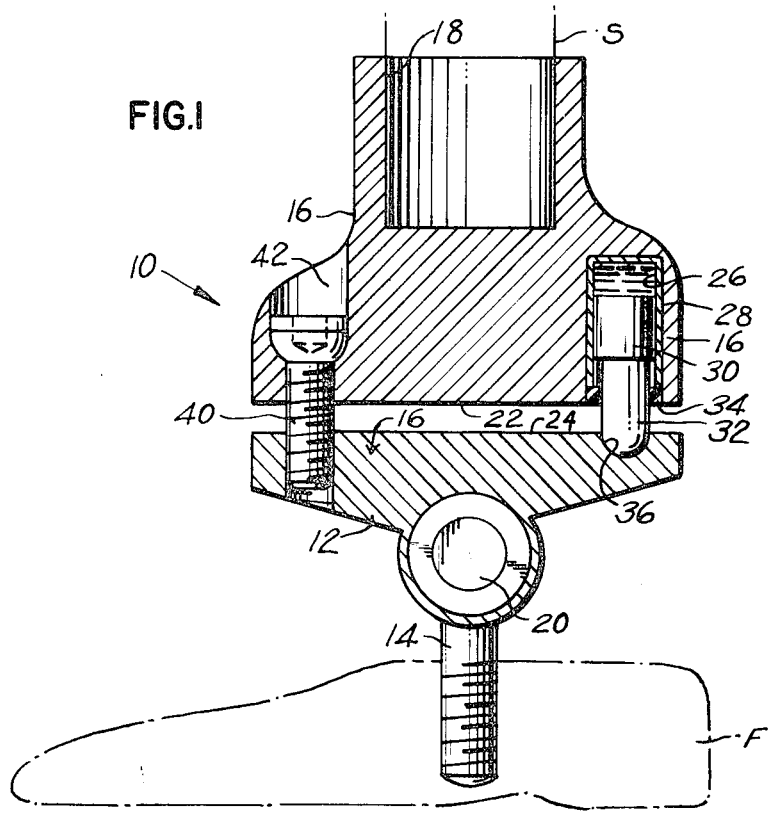
FIG. 1 is a vertical cross-sectional view of a prosthetic joint according to the present invention.

The drawing illustrates the embodiment of the present invention in an ankle joint 10 comprising a base member 12 having a threaded rod 14 for connection to an artificial foot (F) and an upper body member 16 having a socket 18 for receiving a tubular or shaft shaped artificial leg shank S. The rod 14 is conventional in nature and is turnable about a pivot pin or bolt 20, so that the foot to which it is fastened may be flexed in a vertical plane normal to the pin 20. The socket 18 is also conventional in nature and is provided with suitable fastening means for securing the limb to it.

It will be appreciated from the following description that the present apparatus may be embodied in other types of joints or connecting mechanisms. The use of the pivoted threaded foot rod 14 and the limb socket 18 are illustrative only. They may be inverted, or replaced with ball and socket connections and/or other types of well known connections. In fact either the upper or lower member 16 may be formed as an integral part of the limb section to which it is intended to be secured (i.e., the rod 14 may be eliminated and the base 12 formed as part of the foot).

Returning to FIG. 1, the upper member 16 comprises a carrying body having a rectangular horizontal sectional shape, the longer axis of which being adapted to lie along the axis A the foot (or other member) to which it may be connected. The carrying body has rounded corners and edges and is generally shaped to conform to the intended prosthetic use, being, however, shaped to form the socket 18 or other fastening means required. The lower face 22 of the upper body 16 is flat and generally smooth. The lower or base member 12 may also be rectangular and of a generally similar configuration. It has an upper face 24 which is also flat and which lies in direct parallel opposition to the lower face 22 of the upper member 16.

Figure 2:
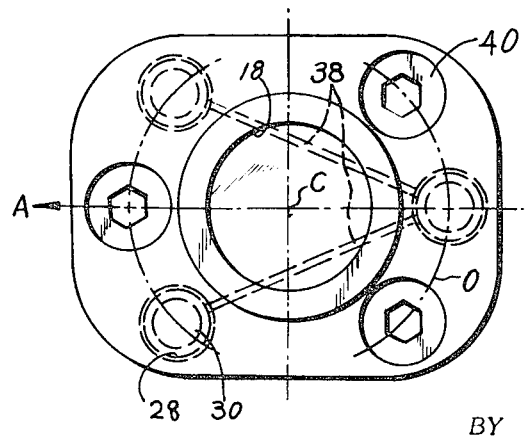
FIG. 2 is a plan view of the same device.

The upper member 16 is provided with a plurality of blind bores 26 formed through the lower face. It is preferred that the member of the bores 26 be at least three and that they be arranged in a triangular array (FIG. 2) in which the major number of bores (i.e. two) are located along a line perpendicular to the axis of the foot at the toe end while the third is located along the foot axis A at the heel end of the body 16.

Each bore is provided with a hydraulic bearing or support means extending outwardly into abutment with the face 24 of the base 12. Each bearing comprises a cylinder 28, force fit within the bore 26, in which a piston 30 is slideably mounted. The piston 30 has an extending rod or pin 32 which is slideable within an annular ring 34 which seals the end of the cylinder 28. The space within the cylinder 28 between the head of the piston 30 and the end of the bore is filled with a suitable oil or other hydraulic liquid having a predetermined degree of compressibility. The piston diameter conforms closely to the cylinder 28 so that little or no radial play occurs and bypass or leakage of any fluid from the cylinder about the piston 30 is avoided.

Each of the extending piston rods 32 extends outwardly of the cylinder 28 with ring 34 and abut against the face 24 of the base member 14 the ring 43 provides a smooth bearing surface or seat for the piston rod 30 further reducing radial play. The face 24 is preferably formed with shallow indentations 36 conforming to the shape and position of the respective piston rods 30. In this manner each of the piston rods are movably received by the base member. The singular cylinder positioned at the heel end of the carrying body 16 is connected by channels or ducts 38 to each of the forward or toe end cylinders 28 so that the hydraulic fluid can freely flow between all of the resilient supporting means. This interconnection furthermore provides for the equalization of pressure on each of the pistons. Other interconnections and fluid communication arrangements are possible.

The base member 12 and the upper carrying body 16 are connected by fastener means 40, preferably screws or bolts. The fasteners 40 are located within through bores 42 extending along corresponding axes in both members. The preferred screws 40 are arranged in a triangular array being the mirror image of the array of blind bores 26, so that the major number of fasteners (i.e. two) are located along a line perpendicular to the axis A of the foot at the heel end while a singular screw is located along the axis A of the foot at the toe end. Preferably each of the screws 40 and blind bores 26 lie equidistant from the center C, the carrying body 16 thus lying along a common circle O. The screws 40 may be replaced by bolts or other adjustable fastening means.

It will be observed that by this construction the connecting screws 40 and the resilient piston assemblies act in opposed force directions to each other so that as the screws are tightened the pistons compress the hydraulic fluid and are forced outward against the abutting face of the base member 12 with greater force. This action and reaction stabilizes the relative positions between the members, under certain tension, and at certain degree of hydraulic compression to obtain a secure and fixed joint. The piston rods 32 seat within the hollows or indents 36 formed in the face of the base member preventing relative sliding between the base 12 and the upper carrying body 16.

In placing the joint in operation, the device is located as previously described between two prosthetic sections such as the foot and shank. Thereafter, the desired angle between the shank and the foot is obtained by loosening one or two selected screws 40 and tightening one or two of the others until the proper inclination is obtained. As this is done the pistons 30 are displaced inwardly or outwardly depending on the inclination. Because of the connecting ducts 38 the hydraulic pressure is equalized between each of the piston-cylinders so that the reaction of the pistons and the screws securely places the body and base members in a fixed angular position and each of the pistons firmly seated within their respective indents 38. The use of a triangular array of three pistons and screws in the manner shown provides a three point contact which enables the the inclination of the device in any direction. Other geometrical arrangements could effect the same benefit.

By employing a joint of the present type at both ends of a leg shank (for example at both the foot and knee joints), a variety of angular positions may be obtained for a given prosthesis. In this case each joint must be adjusted with regard to the other so that a suitable overall angle of inclination is obtained. It is possible that in the course of the adjustment of the present device the length of the prosthesis is shortened. However, this problem is easily overcome by lengthening the tubular shank, adjusting its position of fastening and by any one of many well known steps.

As indicated above, it is preferred that two of the three screws 40 be placed on the heel side of the device. The greatest amount of wear and tear, flexing, work and other stress is placed at the heel end of a prosthetic device. By placing the screws at this end, the device is constructed to be more rugged and sturdy and will have a longer life. By placing the blind bores 26 and the bearings in a mirror image to the screws 40, that is with two of them at the toe end a further advantage is obtained in that the toe end is provided with sufficient working pressure or bearing support to stabilize the joint while the one piston at the heel end will produce sufficient pressure to equalize the force on each of the other pistons. Consequently, the present apparatus is capable of withstanding the strongest shock, or impacts which might occur during actual use of the protheses. The device is furthermore very rugged and long lasting.

It will thus be seen that in addition to the ruggedness and strength of the present device, it is light, simple to make and extremely small. As a result, the present device may be built into the prostheses as an integrated part of it, although it may still be used conventionally, as a removable connecting member.

A number of modifications and changes to the structure described have been indicated. Additional modification will be readily apparent to those skilled in this art. It is intended that the present disclosure be illustrative only and not limiting in any manner.

What is claimed:

1. A connector for joining two sections of a prosthetic device comprising:
   a. a body adapted for attachment to one of said prosthetic sections,
   b. hydraulic bearings mounted in said body and extending therefrom,
   c. means interconnecting said bearings in fluid communication,
   d. a base adapted for attachment to the other of said sections and abutting against said extended bearings,
   e. adjustable fastening means for securing said base to said body at selected angles,
   f. said fastening means cooperating with said bearings to provide reactive forces maintaining said body and said base at the selected angle.

2. The connector according to claim 1 wherein said bearings comprise at least three bearings arranged in a triangular array.

3. The connector according to claim 2 wherein said fasteners comprise at least three fastening means arranged in an array, the mirror image of said bearings.

4. The connector according to claim 3 wherein each bearing is located in a blind bore formed in said body, and comprises a piston having an extending rod, and hydraulic fluid located between the piston and the bottom of the blind bore.

5. The connector according to claim 4 wherein said interconnecting means comprise ducts formed within said body interconnecting said blind bores.

6. The connector according to claim 5 wherein each said bearing is provided with an impermeable cylinder, fit within said bore, said piston being slideably mounted therein, and includes ring means surrounding said extending rod.

7. The connector according to claim 5 wherein said base member is formed with indents in the face thereof receiving said extending piston rods.

8. The connector according to claim 3 wherein said fastening means comprises threaded members secured within axially aligned receiving holes in said body and said base.

9. A prosthetic device comprising a pair of limb members and a connector according to claim 3 joined thereto wherein the major portion of said fastening means are located at rear of said body with respect to the direction of the use of the prosthetic device.

10. The connector according to claim 9 wherein the major portion of said bearings are located at the front of said body with respect to the direction of use thereof.

11. A combination prosthetic section member and connector according to claim 1 wherein the base is formed as an integral one-piece part of the prosthetic section.

12. A combination prosthetic section member and connector according to claim 1 wherein the body is formed as an integral one-piece part of the prosthetic section.

13. The connector according to claim 9 wherein said bearings and fastening means are arranged radially along a common circle having a center lying in the central axis of said prosthetic device.

14. A prosthetic device comprising a pair of limb members and a joint connector therebetween formed according to claim 1.

* * * * *